United States Patent [19]

Robinson

[11] 4,267,801

[45] May 19, 1981

[54] CIRCULATING FLUIDIZED BED BOILER

[75] Inventor: Edwin Robinson, Darlington, England

[73] Assignee: Deborah Fluidised Combustion Limited, Peterlee, England

[21] Appl. No.: 43,880

[22] Filed: May 30, 1979

[30] Foreign Application Priority Data

May 31, 1978 [GB] United Kingdom ............... 25698/78

[51] Int. Cl.³ .............................................. B09B 3/00
[52] U.S. Cl. .................................. 122/4 D; 110/245;
110/263; 110/165 R; 431/170
[58] Field of Search ........... 110/263, 245, 347, 165 R;
431/170, 7; 122/4 D; 34/57 A

[56] References Cited

U.S. PATENT DOCUMENTS

| 783,722 | 2/1905 | Cossio | 110/263 |
| 4,026,223 | 5/1977 | Robbins | 110/165 R |
| 4,196,676 | 4/1980 | Brown et al. | 431/170 X |

FOREIGN PATENT DOCUMENTS

| 1522601 | 8/1978 | United Kingdom | 110/245 |
| 1540378 | 2/1979 | United Kingdom | 122/4 D |
| 2011594 | 7/1979 | United Kingdom | 110/245 |

Primary Examiner—Edward G. Favors
Attorney, Agent, or Firm—Reising, Ethington, Barnard, Perry & Brooks

[57] ABSTRACT

A boiler wherein the combustion unit includes a fluidized bed which may be fluidized in a non-uniform manner to effect circulation of bed material by means of dual air distributors located within the bed.

8 Claims, 5 Drawing Figures

CIRCULATING FLUIDIZED BED BOILER

This invention relates to boilers.

Existing oil or gas fired packaged shell boilers do not achieve the boiler markers claimed rating when solid fuel is burnt. The burning of solid fuel requires stoking of the fuel in order to achieve efficient combustion thereof. Automatic mechanical stoking has proved more efficient than manual stoking due to better control of fuel/air ratios. The use of fluidised beds has led to a further improvement in that the amount of excess air required for efficient combustion is much lower than with automatic mechanical stoking. However, even with fluidised bed burners the boiler output has not reached the claimed rating. In conventional fluidised bed burners air is supplied to the bed material through a perforated base below which are located plenum chambers. Accordingly the plenum chambers are located between the fluidised bed and part of the wall of the combustion chamber. This wall forms the primary heat transfer surface and therefore the location of the plenum chambers in effect masks off part of the primary heat transfer surface. Though the provision of secondary heat transfer surfaces (boiler tubes) placed within the bed may allow an increased boiler rating, the cost and complication is unjustified in boilers below a capacity of 10,000,000 btu/hr. Furthermore only solid fuels with low ash contents can be burned as no practical means of removing the defluidised ash from the bed is provided.

According to the present invention there is provided a boiler comprising fuel burning means and means for allowing heat exchange between the products of combustion of the fuel and a working fluid, the fuel burning means including a bed of particulate material and means for fluidising the bed in a non-uniform manner to effect circulation of the bed material within the bed, the bed fluidising means including air distributors located within the bed so as to be substantially surrounded by bed material.

A boiler in accordance with the present invention is an alternative to a conventional oil or gas burner used in packaged boilers, but in addition it will also burn other fuels, such as solid fuels.

Preferably the heat exchange means include a plurality of tubes either through or around which the combustion gases may be passed and, respectively, either around or through which the working fluid may be passed. More preferably these passages are arranged substantially horizontally above said bed. The arrangement may be a so-called single pass system in which the gas flow through the passages is in one direction only before leaving the boiler. Alternatively, the arrangement may be a so-called double pass system whereby gases flow in one direction through passages and are redirected through further passages before leaving the boiler.

Preferably the bed is arranged within a chamber located within the boiler, the working fluid being, in use, passed through the space defined by the exterior of the chamber wall and the interior of the boiler wall and the bed material extending so as to contact the interior of the chamber wall over at least a portion thereof. In this way a substantial heat exchange can take place between the bed and the water outside the chamber and this increases the over-all efficiency of heat exchange and ensures that the fluidised bed does not become too hot.

Preferably the bed fluidising means include means for feeding air into the bed and the bed includes a spent fuel outlet, the arrangement being such that air may be pre-heated by spent fuel before the air is fed to the bed. For instance the spent fuel may be ash, which contains a great deal of heat and this hot ash may be used to pre-heat the air, the pre-heated air then being mixed with the fuel so that it is used to pump the fuel on to the fluidised bed.

Preferably the boiler includes a single fuel inlet to the bed. With known boilers utilising fluidised beds, it is necessary to provide a plurality of fuel inlets so as to give a good distribution of fuel over the grate area, as mentioned above. However, in the case of the boiler of the present invention only a single fuel inlet is necessary because the bed is fluidised in such a way that there is a circulation of the bed material thereby distributing the fuel throughout the bed.

Preferably the air distributors are arranged so that air passed through them into the bed causes circulation of the bed material substantially transversely of the longitudinal axis of the boiler. More preferably the air distributors are arranged in two arcs, air being fed to the distributors so as to effect circulation of the bed material in two zones being on opposite sides of a vertical longitudinal plane through the bed. In each zone the circulation preferably takes place around the air distributor or distributors in that zone so that the entire circumference of the combustion chamber is exposed to heat transfer. In such an arrangement it is not necessary to provide further heat transfer surface in the bed itself unless an increase in boiler rating is required.

One or more longitudinally arranged screw extractor devices may be provided for removing the spent fuel from the boiler. Thus when burning low grade fuels the heavy defluidised ash falls to the bottom of the combustion chamber between the arcs of air distributors where it can be removed using the screw extractors. In the case where such screw extractors are provided the screw shafts may be hollow and part of the combustion air fed down these hollow shafts to assist the circulation of the bed material, and at the same time keeping the screw extractor arrangement cool.

The heat transfer rate in a boiler according to the present invention is proportional to the velocity of circulation of the bed material in contact with the boiler wall. By varying the air flow to the distributors the velocity and circulation of the bed can be controlled, thus enabling the burner to follow the load on the boiler.

The burner may burn oil or gas separately or together with solid fuel. The gas or oil may be fed into the bed down tubes located within the air distributors.

The combustion is started by passing pre-heated air, or a mixture of gas and air, through the bed and utilising a burner located above the bed in the front wall of the burner.

Coal or other solid fuel can be fed into the bed either mechanically or pneumatically through the front wall, the injection of the fuel being assisted by secondary air.

Included within the scope of the present invention is fuel combustion means adapted for fitting to a boiler, said fuel combustion means comprising a bed for receiving particulate material and means for fluidising material in the bed in a non-uniform manner to effect circulation of said material within the bed, the bed fluidising means including air distributors located within the bed so as to be substantially surrounded by bed material.

Such fuel combustion means may be used to replace, for instance, an oil burner in an existing boiler.

The particulate bed material may be inert, for instance, a silica sand or it may be reactive, for instance calcium carbonate which will react with sulphur in the fuel to form calcium sulphate, thereby reducing the emission of sulphur into the atmosphere.

Embodiments of the present invention will now be described by way of examples only, and with reference to the accompanying drawings, in which.

Figure 1:
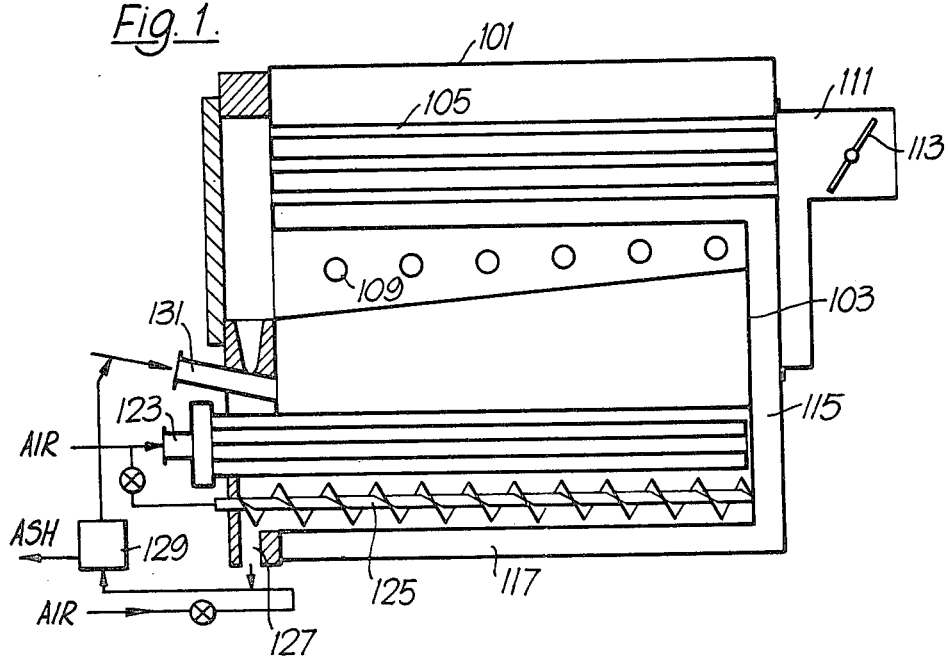
FIG. 1 is a longitudinal section of a boiler in accordance with the present invention.
Figure 2:
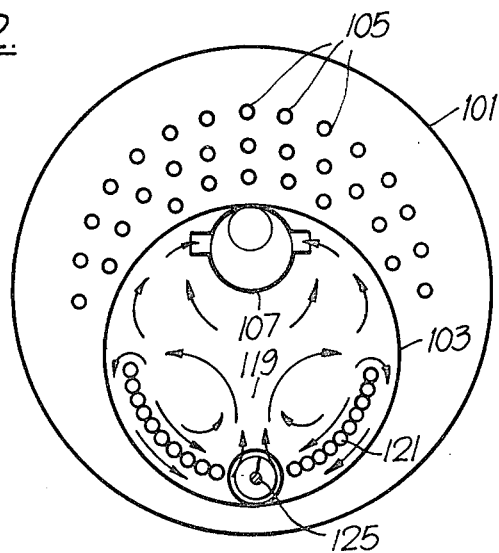
FIG. 2 is a transverse section of the boiler of FIG. 1.

Referring to FIGS. 1 and 2 the drawings, a boiler in accordance with the present invention comprises a shell 101 within which is located a combustion chamber 103, the space between combustion chamber 103 and the wall of shell 101 being provided with tubes 105 around which water may be circulated. Gases from the combustion chamber 103 pass into a conduit 107 through ports 109 and thence to the front of boiler 101 where they enter tubes 105. The gases pass through tubes 105 from the front to the back of the boiler and enter outlet 111 controlled by butterfly valve 113. Thus the gas makes only a single pass through the boiler although in another similar embodiment, the arrangement may be a double pass system.

The boiler shown in the drawings is a wet back boiler, the water passing into space 115 at the back of the combustion chamber and also circulating under the combustion chamber within space 117.

Within combustion chamber 103 there is a fluidised bed, the wall of which is provided entirely by the wall of chamber 103. Within the bed there is provided particulate material 119 which may be inert material such as silica sand or catalytic material such as calcium carbonate. Located within the bed material is a plurality of tubes 121 which extend longitudinally of the boiler. These tubes 121 are arranged in two arcs, each arc of tubes being suspended some distance away from the wall of combustion chamber 103. Air may be supplied to the tubes through inlet 123 and tubes 121 are perforated so that the air passes from the tubes into the bed of material thereby to fluidise it. The arrangement is such that the air causes fluidisation of the bed in a circulating manner as indicated by the arrows in FIG. 2. It will be seen that the circulation of the bed material is in planes perpendicular to the longitudinal axis of the boiler. By arranging the air distribution tubes within the bed material itself, there is contact of the bed material over a much greater area of the wall of the combustion chamber, that is to say there is no "dead space" at the bottom of the fluidised bed and it is possible thereby to achieve much greater heat exchange through the wall of the combustion chamber.

Since the movement of the bed material is in planes perpendicular to the longitudinal axis of the boiler a screw device 125 is provided between the two arcs of tubes. This device is rotated during use of the boiler and acts to remove ash from the bottom of the bed through outlet 127. The removed ash, together with some bed material, is then mixed with air to preheat the latter. The ash is separated in separator device 129 and the resultant pre-heated air and bed material is then mixed with fuel and fed to the bed through inlet 131.

In the above-described embodiment the tubes of each arc of tubes are arranged such that there are no spaces between the tubes, and accordingly the flow of material takes place around the arc to tubes as a whole. This ensures good ash extraction. Furthermore the bed material is at its hottest above the arcs of the tubes and is comparatively cool close to the tubes themselves. Thus the tubes do not have to be made out of very expensive heat resistant stainless steel.

Figure 3:
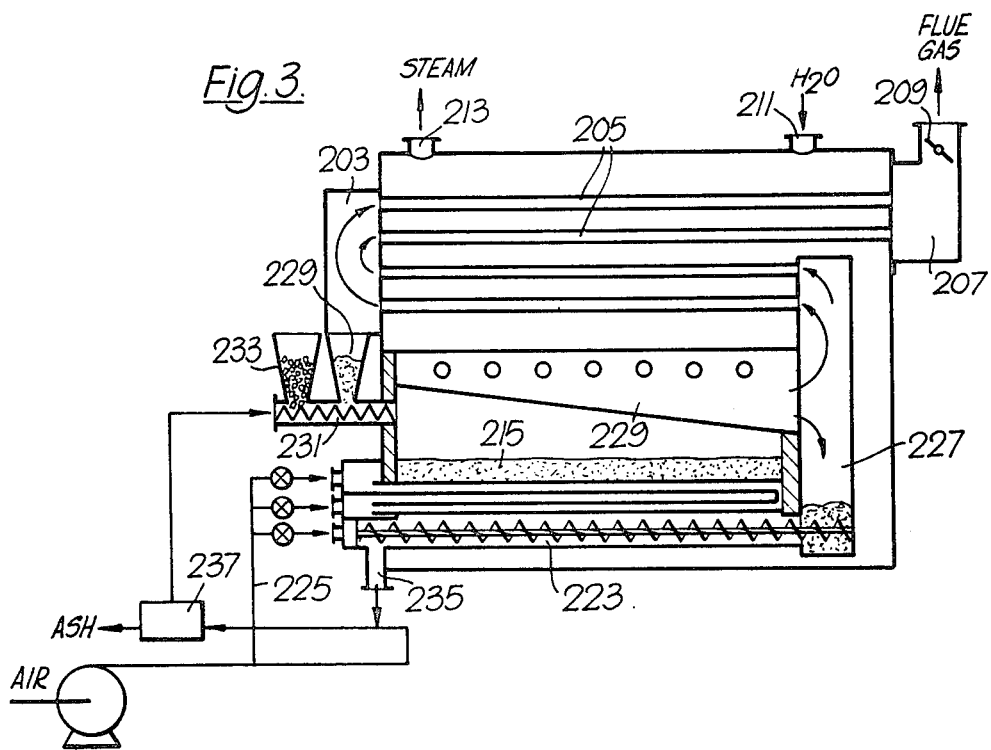
FIG. 3 is a longitudinal section of another boiler in accordance with the present invention.
Figure 4:
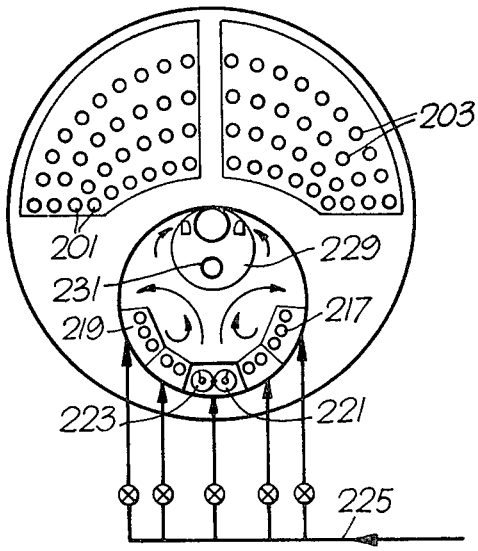
FIG. 4 is a transverse section of the boiler of FIG. 3.

Referring to FIGS. 3 and 4 of the drawings, a second boiler in accordance with the present invention is somewhat similar to the boiler of FIGS. 1 and 2. However, it is a double pass boiler in which gases from the combustion chamber pass twice across the length of the boiler, the first pass being through tubes 201 into smoke boxes 203. The gases then pass into tubes 205 and make the second pass along the length of the boiler before entering outlet 207 controlled by butterfly valve 209. Although not shown in FIGS. 1 and 2, both boilers include an inlet 211 for water and an outlet 213 for steam.

Located within the bed of particulate material 215 are the arcs of air distributor tubes 217 and 219. In FIGS. 3 and 4 the air supply to these tubes is shown in more detail and it can be seen that, for each arc of tubes 217 and 219, air may be supplied separately to the lower and the upper tubes. In this embodiment there are two screw extractors 221 and 223 and air may also be supplied, along pipe 225 to the hollow shafts of these screw extractors.

The screw extractors extend beyond the bed 215 into expansion chamber 227. Accordingly bed material carried over into the expansion chamber by the combustion gases may be "collected" by the screw extractor. It should be added however that the amount of bed material carried over by the combustion gases is relatively small since the flue gas conduit 229 in the combustion chamber draws off the combustion or flue gases from the bed evenly along the length of the bed, thereby eliminating stratification and high velocity gas streams which tend to entrain bed material.

Lighter particles may be carried along the first pass of tubes 201 into the smoke boxes 203. These particles tend to settle in trough 229 from where they are returned to the combustion chamber by means of screw injector 231. Also fed to injector 231 via trough or hopper 233 is the fuel, for instance, coal which is to be burnt. Finally secondary air and bed material is also fed to injector 231, the bed material having been separated from the mixture of bed material and ash which leaves the combustion chamber through outlet 235, separation taking place in separator 237.

Figure 5:
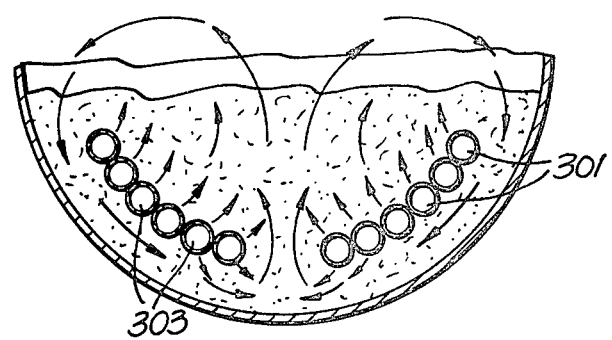
FIG. 5 shows in detail the circulation of the bed material in the fluidised bed burner of a boiler of the present invention.

Referring to FIG. 5, the air and bed material flow out of and around the distributor tubes 301 and 303 is shown in greater detail. Except for tubes at the bottom of each arc of tubes the air flow is in a direction generally upwardly and towards the centre of the combustion chamber. The air velocity of the lower tubes is higher than that of the upper tubes. For the lower tubes there is also some air flow in a direction downwardly and towards the centre of the combustion chamber.

As a result, circulation of bed material takes place in two regions separated by a vertical longitudinal plane through the combustion chamber. In each region circulation of bed material takes place upwardly from the bottom of the arc of tubes in that region and downwardly so as to pass mainly between the arc of tubes and the wall of the combustion chamber. Fluidisation occurs above the arc of tubes and not between the tubes in the wall of the combustion chamber. The bed material is at its hottest well above the arc of tubes and consequently the material of these tubes need not be of the highest quality heat resistant stainless steel. Furthermore the pattern of flow of bed material is such that the ash tends to accumulate at the bottom of the chamber where it can be efficiently extracted.

I claim:

1. A boiler comprising fuel burning means and means allowing heat exchange between the products of combustion of the fuel and a working fluid, the fuel burning means including a substantially cylindrical housing for accommodating a bed of particulate material, air distributors located within the housing so as to be surrounded by bed material, said air distributors effecting fluidisation of the bed material, said air distributors extending longitudinally of and being spaced from the housing and comprising first and second air distributors arranged on opposite sides of a vertical longitudinal plane through the bed and on each side extending substantially circumferentially with respect to the axis of the housing, and means for feeding air to the air distributors to effect circulation of the bed material in two zones on said opposite sides of said vertical longitudinal plane.

2. A boiler according to claim 1, wherein the heat exchange means includes a plurality of tubes for transferring heat from the combustion gases to the working fluid.

3. A boiler according to claim 2, wherein the tubes are arranged as a single pass system in which the tubes pass through the boiler only once before leaving the boiler.

4. A boiler according to claim 2, wherein the tubes are arranged in a double pass system in which the tubes pass through the boiler twice before leaving the boiler.

5. A boiler according to claim 1, wherein the bed includes a spent fuel outlet, means for heating air by the spent fuel, and means for feeding the air heated by the spent fuel back to the boiler.

6. A boiler according to claim 1 further including a longitudinally arranged screw device for removing the spent fuel from the boiler.

7. A boiler according to claim 1 which includes a single fuel inlet to the bed.

8. Fuel combustion means adapted for fitting to a boiler, said fuel combustion means comprising a substantially cylindrical housing for accommodating a bed of particulate material, air distributors located within the housing so as to be surrounded by bed material, said air distributors effecting fluidisation of the bed material, said air distributors extending longitudinally of and being spaced from the housing and comprising first and second air distributors arranged on opposite sides of a vertical longitudinal plane through the bed and on each side extending substantially circumferentially with respect to the axis of the housing, and means for feeding air to the air distributors to effect circulation of the bed material in two zones on said opposite sides of said vertical longitudinal plane.

* * * * *

UNITED STATES PATENT AND TRADEMARK OFFICE
CERTIFICATE OF CORRECTION

PATENT NO. : 4,267,801

DATED : May 19, 1981

INVENTOR(S) : Edwin Robinson

It is certified that error appears in the above—identified patent and that said Letters Patent is hereby corrected as shown below:

On the face page of the patent under "Foreign Application Priority Data" change "25698/78" to --25699/78--; and Column 1, line 6 "markers" should be --makers--.

Signed and Sealed this

Fifteenth Day of September 1981

[SEAL]

Attest:

Attesting Officer

GERALD J. MOSSINGHOFF

Commissioner of Patents and Trademarks